UNITED STATES PATENT OFFICE.

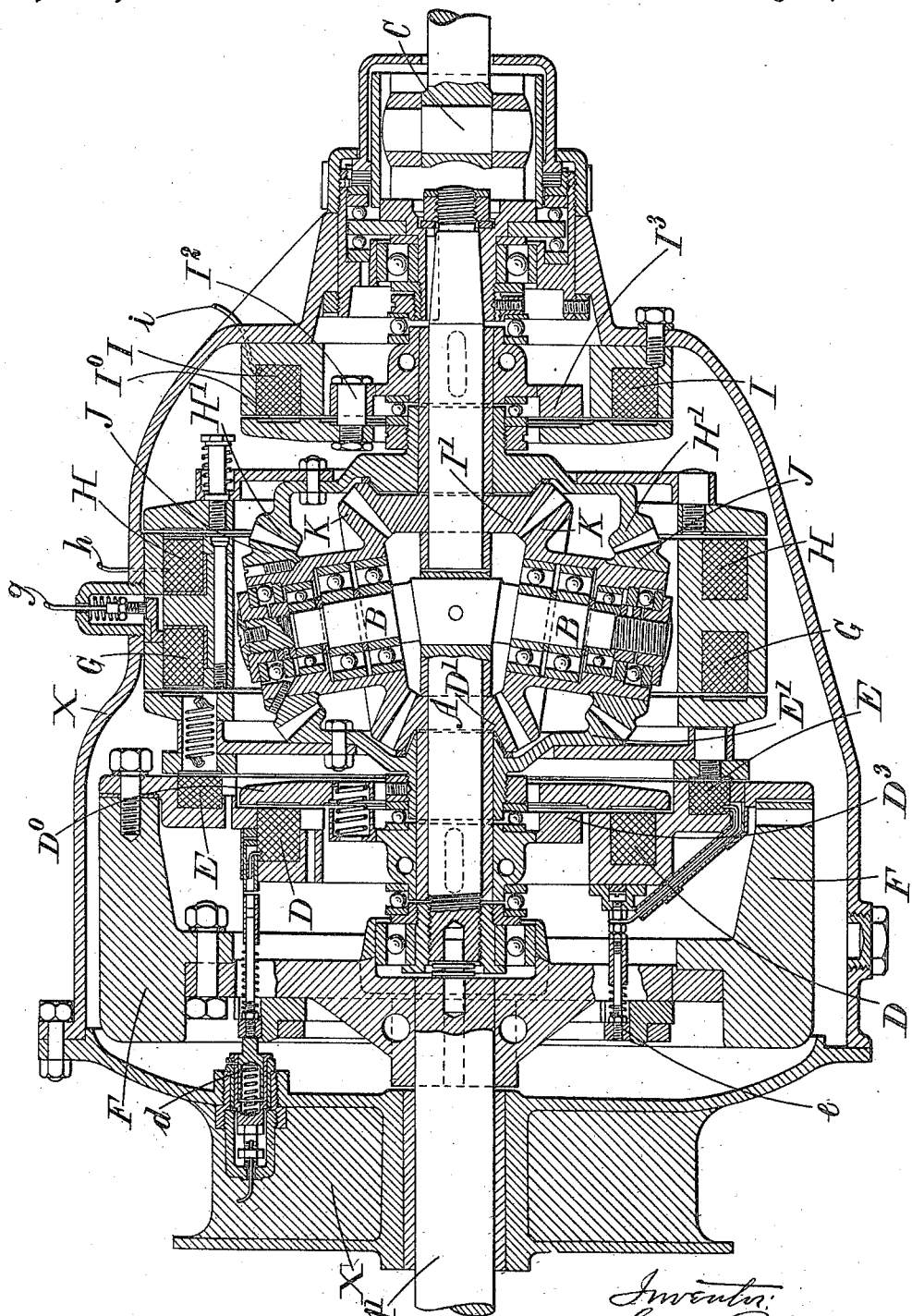

GEORGE POLLARD, OF PICCADILLY, WESTMINSTER, ENGLAND, ASSIGNOR TO THE MENCO-ELMA SYNDICATE LIMITED, OF LONDON, ENGLAND.

SPEED-CHANGING, REVERSING, AND BRAKING GEARING.

1,238,565.   Specification of Letters Patent.   Patented Aug. 28, 1917.

Application filed October 30, 1916. Serial No. 128,534.

*To all whom it may concern:*

Be it known that I, GEORGE POLLARD, a subject of the King of England, residing at Piccadilly, in the city of Westminster, England, have invented an Improved Speed-Changing, Reversing, and Braking Gearing, of which the following is a specification.

This invention relates to an improved speed-changing, reversing and braking gearing more especially intended for motor road-vehicles.

In the specification of reissued U. S. Letters Patent No. 14131 of May 9th, 1916, issued to Messrs. Menco-Elma Syndicate Limited of London, England an electro-mechanical epicyclic speed-changing, reversing and braking gearing was described that gave four forward speeds and a reverse, and was especially intended for motor road-vehicles. It contained as its leading characteristics a driving-shaft and a driven shaft, a planetary shaft operatively connected to one of them, sun-gears loose and turning on a bearing co-axial with the said driving and driven shafts, and also planet-gears loose on said planetary-shaft interconnected with one another and engaging the sun-gears.

Further, the axis of the planetary shaft in the example illustrated in the drawing appended to the aforesaid prior specification was at right angles to (and therefore the arms or ends of the shaft were also at right angles to) the axis of the driving and driven shafts, and as a consequence its employment involved the limitation that the diameter of the sun-gear meshing with one side of one of the interconnected planet-wheels had to be identical with the diameter of the sun-wheel meshing with the other side of the same planet-wheel.

This limitation hampered the designer of the gear in that he could not choose for the reverse a suitable velocity-ratio in relation to the driving shaft unless in the same design he employed inconvenient velocity-ratios for some of the forward speeds.

One object of the present invention is the removal of the limitation above referred to in order that the velocity-ratio of the reverse in relation to the driving shaft in a gear possessing the characteristics aforesaid may be selected by the designer with a greater freedom of choice than was conveniently possible when the limitation existed. Moreover, another object of the present invention is to enable by removal of the said limitation a gearing possessing the characteristics aforesaid to give five (instead of four) forward speeds, without increase in the number of wheels, pinions, shafts, clutches and brakes employed in the known electro-mechanical four-speed gearing hereinabove referred to.

The accompanying drawing represents in longitudinal section, a gear constructed in accordance with this invention.

The gear comprises a shaft A and arms B, the arms intersecting the shaft but not at right angles. The arms B in the example illustrated lean from the shaft A toward the flywheel F. The arms B receive motion from the motor (which motor actuates the shaft $A^1$ carrying the fly-wheel F) as hereinafter explained, and transmit this motion to the driven shaft A, controlling a road-wheel of the vehicle, through the medium of a Cardan joint C.

In order to obtain the five speeds in forward running, the reversal, or backward running, the direct drive and the braking of the vehicle a system of magnetic clutches and magnetic brakes is employed, this system comprising the magnetic clutches D and E in connection with the fly-wheel F and therefore rotating at the speed of a motor. It also comprises the magnetic brakes G, H and I secured to the casing X containing the mechanism so that the sun-wheels $E^1$ $H^1$ $I^1$ can when required be held against rotation. The magnetic clutches are supplied with current through any suitable rubbing contacts such as the spring contacts $d$ and $e$, while the magnetic brakes are supplied with current through the conductors $g$, $h$ and $i$. The said clutches and brakes operate by magnetic attraction their corresponding disks which are connected with the bevel sun-wheels $D^1$ $E^1$ $H^1$ $I^1$, which wheels are concentric with the shaft A, and are always in engagement with the planetary wheels J and K, which latter are integral with each other, or fixed together, and are rotatably mounted on the inclined arms B. From the disk $I°$ extend pins such as $I^2$ which fit and slide endwise in corresponding round holes in the ring $I^3$, the latter being fixed on the long hub of the wheel $I^1$. Thus the disk $I°$ engages the toothed wheel I¹ so that there is no relative motion between them; in like manner is the disk D° non-rotatably engaged with the toothed wheel D¹.

The operation of this speed-changing gear, constructed in the example illustrated to give five speeds in forward running, one slow speed in backward running, and also a braking action, is as follows: To obtain the first forward running speed, when the motor shaft A¹ has been started, the current is sent through the clutch D, and brake H. The sun-wheel D¹ then rotates at the same speed as the motor and the sun-wheel H¹ is held stationary. The planetary wheel J and the planetary wheel K both operated by the wheel D¹, being constrained to rotate as one, react on the stationary wheel H¹, and cause the arms B, and consequently the shaft A to move in the direction in which the motor shaft A¹ rotates. The forward speed of the shaft A will in this case be so low in relation to that of the driving motor that it may be regarded as an emergency slow speed used only in exceptional cases such as the climbing of very steep acclivities. The second forward-running speed, next to be referred to gives power enough for the ascent of all ordinary slopes. The second forward-running speed is obtained by sending the current through the clutch D, and brake I, and the third by sending the current through the clutch E, and the brake H. For the fourth forward-running speed, the current is supplied to the clutch E, and the brake I. In this case the wheel E¹ rotates at the speed of the motor and the pinion I¹, is stationary. The planetary wheels K and planetary wheels J being constrained to rotate as one, react on the stationary pinion I¹ and cause the arms B, and consequently the shaft A, to move in the direction of rotation of the motor. The fifth or 1:1 forward-running speed can be obtained by passing the current through D and E, causing the sun-wheels D¹ E¹ to rotate, the planetary wheels J and K being thus jammed (the ratio of the numbers of teeth being different) and driving the arms B at the same speed as the clutches D and E, this speed corresponding to direct drive. The slow reversal, or backward running, is obtained by causing the current to pass through the clutch D and the brake G. The wheel D¹ then runs at the speed of the shaft A¹ while the wheel E¹ is rendered stationary. The planetary wheels J and the planetary wheels K driven by the pinion D¹ are constrained to rotate on themselves and in this movement they react on the pinion E¹ which is stationary and then take around the arms B, and consequently the shaft A, in a direction opposite to that of the rotation of the shaft A¹. In this way any desired graduation of the speeds can be obtained by combining the ratios of the number of teeth which are in engagement in the pairs of bevel toothed wheels. The braking of the car is effected by passing the current through H and I. The planetary wheels J and K being thus rendered stationary on the wheels H¹ and I¹ prevent the arms B, and consequently the shaft A, from moving and the vehicle stops. This braking action is comparable to the clutching for direct engagement. In all cases (and especially for braking) it is desirable to apply a gradually increasing current so as to avoid jerks.

The current required for the clutching and braking electromagnets can be supplied from any suitable source of electricity. For example a small dynamo operated for instance by the arrangement usually employed for the lighting installation on ordinary vehicles will, without any addition, fulfil all the functions required for the perfect control of the aforesaid clutches and brakes and for internal and external lighting.

The wheels E¹ and I¹ might be of the same diameter: but the inclination of the axis of each planetary wheel such as J or K renders possible the use as the sun-gear I¹ meshing with one side of the planetary pinion K of a wheel larger than the sun-wheel D¹ meshing with the other side of the pinion K. Similarly and with regard to the pinion J, the wheel H¹ is larger than the wheel E¹. The ability to use a small diameter for D¹ in relation to that of E¹, which latter is not reduced to the same degree by the inclination of the planet axis by e. g. making the arm B¹ lean toward the fly-wheel F, conduces to the easy design of the slow-reverse construction.

What I claim as my invention and desire to secure by Letters Patent is:—

1. In an electro-magnetic change-speed gearing the combination of a drive shaft and a driven shaft, two driving sun-gears mounted to rotate about the axis of said driven shaft, third and fourth sun-gears one of them of a diameter different from the diameter of one at least of the two driving sun-gears, and each likewise mounted to rotate about the axis of said driven shaft, a mounting fixed on said driven shaft to support planet-gears, planet bevel-gears turning about their own axes on said mounting interconnected with one another and engaging all said sun-gears at any angle that is other than a right angle, a magnetic clutch on the drive shaft adapted to clutch alternatively each driving sun-gear, a stationary magnetic brake adapted to engage with that one of the driving sun-gears which is larger in diameter relatively to its own planet than is its companion driving sun-gear relatively to the planet of said companion, and two other stationary magnetic brakes whereof one is adapted to engage the third sun-gear the other being adapted to engage the fourth sun-gear.

2. In an electro-magnetic change-speed gearing the combination of a drive shaft and a driven shaft, two driving sun-gears mounted to turn about the axis of said driven shaft, a third sun-gear of a diameter different from the diameter of one at least of the two driving sun-gears and like them mounted to rotate about the axis of said driven shaft, a planetary mounting fixed on said driven shaft at an angle that is other than a right angle, planet bevel-gears turning about their own axes on said mounting interconnected with one another and engaging all said sun-gears at an angle that is other than a right angle, a magnetic clutch on the drive shaft adapted to clutch alternatively each driving sun-gear, a stationary magnetic brake adapted to engage with one of the driving sun-gears which is larger in diameter relatively to its own planet than is its companion driving sun-gear relatively to the planet of said companion, and a stationary magnetic brake adapted to engage the third sun-gear.

3. In an electro-magnetic change-speed gearing the combination of a drive shaft and a driven shaft, two driving sun-gears mounted to turn about the axis of said driven shaft, third and fourth sun-gears one of them of a diameter different from the diameter of one at least of the two driving sun-gears, and each likewise mounted to rotate about the axis of said driven shaft, a mounting that is an arm B fixed on said driven shaft and inclined therefrom toward the driving suns at an angle other than a right angle and is used to support planet-gears, planet bevel-gears turning about their own axes on said mounting interconnected with one another and engaging all said sun-gears at any angle that is other than a right angle, a magnetic clutch on the drive shaft adapted to clutch alternatively each driving sun-gear, a stationary magnetic brake adapted to engage with that one of the driving sun-gears which is larger in diameter relatively to its own planet than is its companion driving sun-gear relatively to the planet of said companion, and two other stationary magnetic brakes whereof one is adapted to engage the third sun-gear the other being adapted to engage the fourth sun-gear.

4. In an electro-magnetic change-speed gearing the combination of a drive shaft and a driven shaft, two driving sun-gears mounted to rotate about the axis of said driven shaft, a third sun-gear of a diameter different from the diameter of one at least of the two driving sun-gears, and like them mounted to rotate about the axis of said driven shaft, a planetary mounting that is an arm B fixed on said driven shaft and inclined therefrom toward the driving suns at an angle that is other than a right angle, planet-bevel-gears turning about their own axes on said mounting interconnected with one another and engaging all said sun-gears at an angle that is other than a right angle, a magnetic clutch on the drive shaft adapted to clutch alternatively each driving sun-gear, a stationary magnetic brake adapted to engage with one of the driving sun-gears which is larger in diameter relatively to its own planet than is its companion driving sun-gear relatively to the planet of said companion, and a stationary magnetic brake adapted to engage the third sun-gear.

5. In an electro-magnetic change-speed gearing the combination of a drive shaft and a driven shaft, two driving sun-gears mounted to rotate about the axis of said driven shaft, a third sun-gear of a diameter different from the diameter of one at least of the two driving sun-gears and like them mounted to turn about the axis of said driven shaft, a planetary mounting fixed on said driven shaft, planet bevel-gears turning about their own axes on said mounting interconnected with one another and one of them engaging at opposite ends of its diameter sun-gears at an angle that is other than a right angle, a magnetic clutch on the drive shaft adapted to clutch alternatively each driving sun-gear, a stationary magnetic brake adapted to engage with one of the driving sun-gears which is larger in diameter relatively to its own planet than is its companion driving sun-gear relatively to the planet of said companion, and a stationary magnetic brake adapted to engage the third sun-gear.

In testimony whereof I have signed my name to this specification in the presence of two subscribing witnesses.

GEORGE POLLARD.

Witnesses:
JOHN E. NEWTON,
SAMUEL RHODES.